Aug. 5, 1952        T. C. GLEASON        2,605,851
AIR INTAKE FOR AIRCRAFT TURBOPROPELLER POWER PLANT
Filed Nov. 30, 1946        2 SHEETS—SHEET 1

INVENTOR
THOMAS C. GLEASON
BY
Harness & Harris
ATTORNEYS.

INVENTOR
THOMAS C. GLEASON

Patented Aug. 5, 1952

2,605,851

UNITED STATES PATENT OFFICE 2,605,851

AIR INTAKE FOR AIRCRAFT TURBO-PROPELLER POWER PLANT

Thomas C. Gleason, Detroit, Mich., assignor to Chrysler Corporation, Highland Park, Mich., a corporation of Delaware Application November 30, 1946, Serial No. 713,255

9 Claims. (Cl. 170—135.743)

This invention relates to aircraft having air screw propulsion and especially to an intake and delivery means on aircraft of this type for feeding air to the turbine power plant for driving the propeller.

On air screw propelled planes it has heretofore been proposed to provide air for engine feeding by positioning the air intakes behind the propeller or by providing air scoops on the wings. The former has the disadvantage of being subject to transient wind shifts of air coming off the propeller so that this method of air feeding is usually good in only one position of the propeller. Moreover, air scoops although allowing advantage to be taken of the natural air ram effect of the plane in motion involves use of separated air inlets, considerable duct work and possible deforming of the normal wing shape.

In a turbine power plant for an air screw propelled plane and to which I will refer for the purpose of illustrating my invention, it is especially desirable that the air compressor be fed with the minimum turbulence of air at the greatest possible pressure. I have found that it is possible to obtain this result by proper arrangement of the air feed inlet in the forward fuselage structure of the plane and in a manner permitting the air ram effect of the plane to be utilized. In this regard the air intake path is preferably located in that region of the propellers which is not aerodynamically shaped, so that the propellers contribute no special motion to the air flow. Only in the case of jet planes where the fore position of the fuselage is wholly unobstructed has it been proposed to locate an air feed inlet for power plant feeding at such a position.

I have further discovered that the intake air and its pressure may be substantially augmented by utilizing the rotary character of the propeller nose structure to provide a preliminary fan or air compressor arrangement for feeding the propeller power plant.

Thus it is an object of the present invention to provide an air feed intake structure for air screw propelled planes employing a turbine power plant arranging the same adjacent the forward end of the propeller, preferably ahead of the propeller such that an air ram effect is possible.

Another object is to provide such an air feed intake structure in that region of the propeller which is not aerodynamically shaped whereby to minimize turbulence of the air passing the propeller blades at said structure.

Another object is to provide the rotary nose of the propeller structure with means for augmenting the air intake and/or air pressure obtained at the air inlet by the natural ram effect of the plane in motion.

An additional object is to provide an air feeding arrangement providing the shortest path between air intake and air compressor of the power plant whereby to minimize air feed pressure losses.

A further object is to provide an air fan in the air feed inlet passage.

It is also an object of my invention to provide air intake means in the forward end of the fuselage of an air screw propelled plane which is adapted to provide air for both engine feeding and engine cooling.

Other objects and advantages of my invention will become apparent from the following description of my invention taken in connection with the accompanying drawings wherein.

Figure 1:
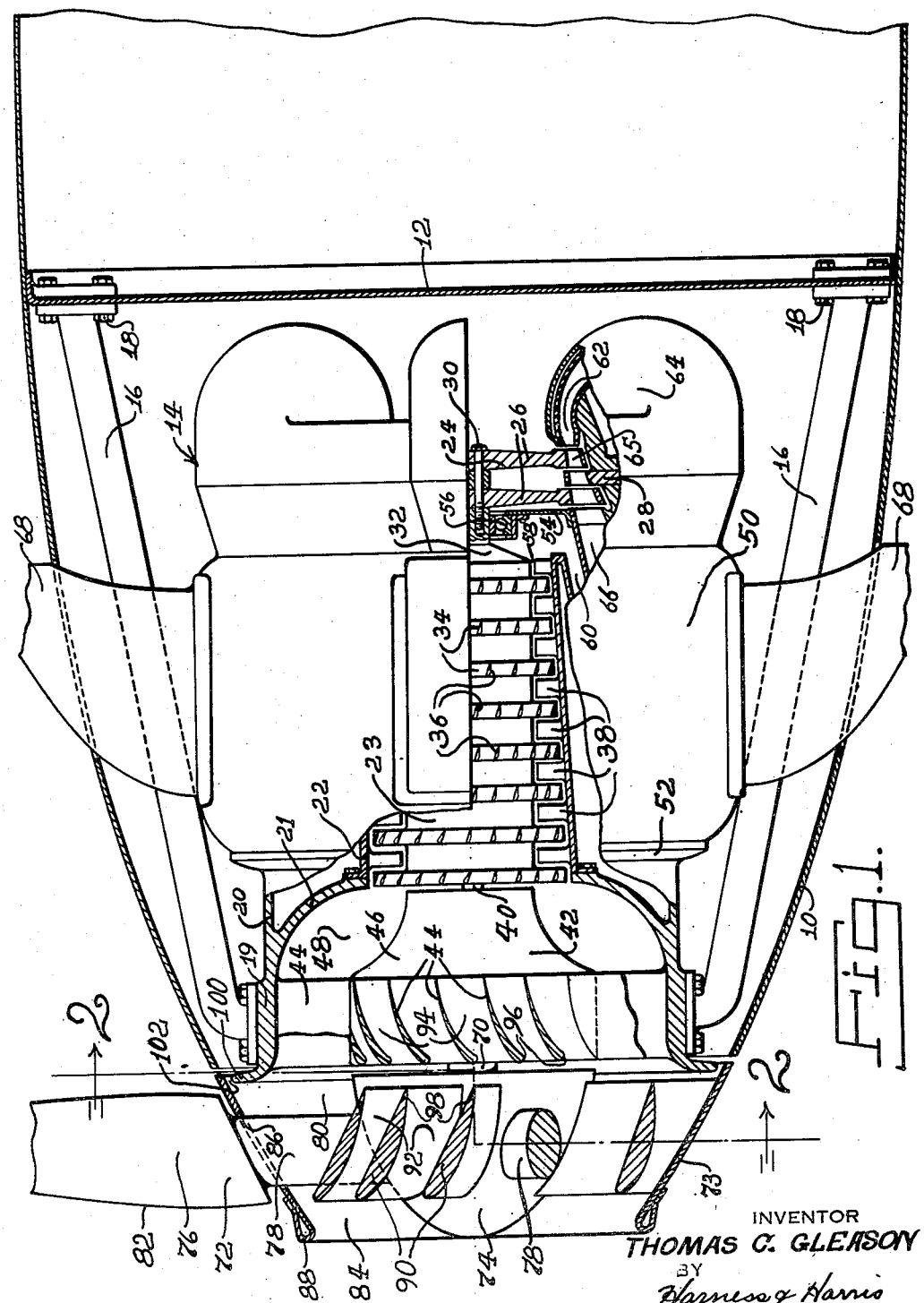
Fig. 1 shows a longitudinal elevational view partly in section showing my invention embodied in an air screw propelled plane having a gas turbine power plant.
Figure 2:
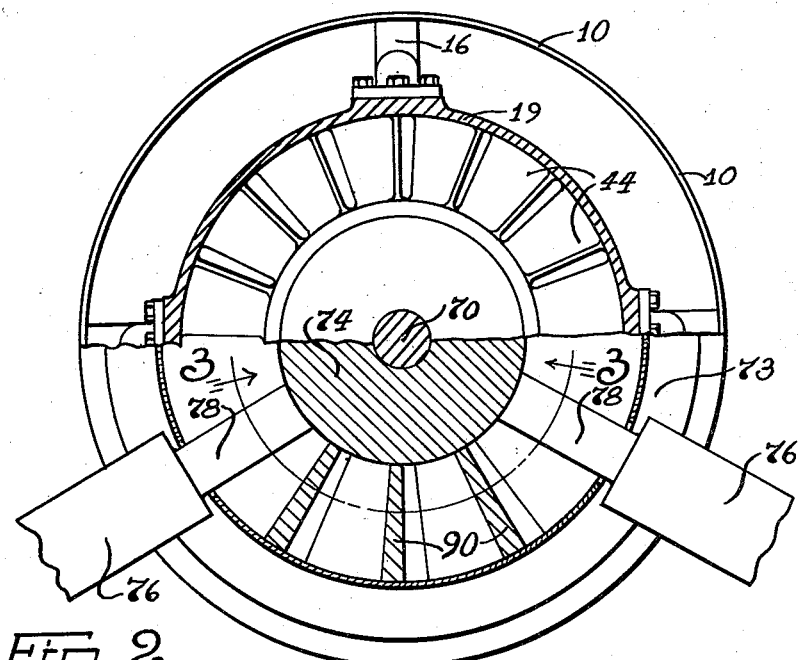
Fig. 2 is an end elevational view partly in section taken at 2—2 of Fig. 1.

Referring to the drawings wherein similar numerals refer to similar parts of the structure, Fig. 1 shows the forward portion of an air screw propelled plane powered by gas turbine means in which 10 is the outer shell or fuselage having a fire wall 12 from which the power plant generally designated by the numeral 14, is supported by a plurality of struts 16. These struts are secured as by bolts 18 to the fire wall 12 and extend forwardly to connect with the wall 19, of a hollow elongated annular conduit or bracket 20 to which the struts are also bolted, the bracket 20 serving to support the power plant 14. The wall 19 has an inwardly curved rearward portion 21 to which is bolted the stationary outer casing 22 of an air compressor, for example, a multi-stage axial compressor generally referred to by the numeral 23 which is driven by a turbine, for example, a two-stage turbine generally identified by the numeral 24 in tandem with the compressor.

The turbine has a two-wheeled bladed rotor 26, which straddles the bladed stator member 28 thereof, and is drivingly connected as by bolts 30 to the rotor 32 of the air compressor 23. The rotor 32 has a plurality of axially spaced wheels 34 having circumferentially arranged blades or vanes 36. Intermediate the wheels 34 are circumferentially arranged guide or stator vanes 38 on the casing 22. The compressor 23 has a forward shaft extension 40 entering a gear box 42 of generally cylindrical shape which is supported by a plurality of circumferentially spaced ribs 44 preferably in the form of vanes to which further reference will hereinafter be made, which ribs connect the casing 46 of the gear box with the wall 19 of the bracket 20. It will be observed that between the casing 46 and wall 19 of the bracket 20 is an annular passage or collection chamber 48 open at its opposite ends and interrupted solely by the ribs 44.

Surrounding the air compressor 23 is a combined heat exchanger and combustion unit generally designated by the numeral 50 and which forms no part of my invention. This unit is supported by a flange 52 of the bracket 20 and has a rearward wall 54 mounting a ball bearing 56 for supporting the compressor rotor 32 for rotation.

The discharge end 58 of the compressor connects with a duct work 60 forming part of the unit 50. The compressed air proceeds through the unit 50 in a cycle usual for a gas turbine power plant and emits at the discharge end 62 of a combustion chamber 64 positioned adjacent the blades 65 of the rotor element 26 of the turbine 24. An exhaust conduit 66 leads from the discharge side of the turbine and has a discharge orifice that extends through the shell 10 as at 68 where it opens to the atmosphere.

The output shaft 70 of the gear box extends forwardly to carry the propeller 72 which has a nose or hub portion 74 from which a plurality of propeller blades 76 (three being shown) eminate radially outwardly. The nose may contain mechanism for rotating the individual blades about their own axis for controlling the pitch thereof. Preferably the propellers are of the usual type wherein the shank portion 78 of the blades adjacent the nose and for some distance outwardly is of a generally circular section, that is, free of any air screw effect.

As previously stated, a feature of my invention is an air feed intake construction which permits use of the ram effect of the plane in motion for increasing the pressure of the feed air and which permits this to be done with a minimum of turbulence by locating the air intake path in that region of the propeller which is not aerodynamically shaped, so that the propeller contributes no special motion to the air flow.

To this end I provide an annular open ended tapering shrouding or nose member 73 which extends forwardly as a continuation of the shell 10 shaping but is separate therefrom and rotatable with the propeller nose 74. This shrouding forms an annular air intake space or passage 80 with the outwardly tapered propeller nose from which it is concentrically spaced. The shrouding should extend forwardly of the fuselage sufficiently to intersect the area swept out by the propeller blades in rotation of the propeller, for example, to a point adjacent a plane passing through the forward leading edge portions 82 of the propeller blades. Preferably, the shrouding will extend forwardly ahead of the propeller blades so as to provide an unobstructed air inlet for the passage 80. On the other hand, the shrouding may for purposes of weight saving, terminate within the aforementioned area.

The propeller blades in Fig. 1 are of the variable pitch type and these project through openings 86 of the shrouding with clearance for rotation on their own axis. In this connection it is again to be noted that the shank portion of the propeller blades between the propeller nose and the shrouding have no aerodynamic shaping so that the propeller blade shanks contribute no special motion to the air flow in the passage 80.

The shrouding while shown of sheet metal with an outward reinforcing lip 88 may be of air foil section if desired. Moreover, the shrouding may be supported in any suitable manner for rotation with the propeller Such support may, for example, take the form of one or more radial spokes or struts 90 between adjacent propeller blades connecting the propeller nose and the shrouding. These are preferably in the form of vanes as shown in Figs. 1, 2, 3, and 4 for reasons hereinafter stated. Moreover, the support may as in Fig. 5, take the form of hollow spokes 110 surrounding and having clearance with respect to the propeller blade shank 78. It will be understood that if a fixed bladed propeller is employed, the shrouding may also or alternatively be supported from the blades themselves.

As previously stated, the supporting ribs 44 and 90, respectively, are preferably in the form of vaned elements which, as seen in Fig. 1, are of air foil section. A feature of my invention is to employ these ribs 44 and 90 to form an initial compressor stage to augment the pressure of the air entering the inlet 84 for passage to the compressor 23.

Thus the vanes 90 (three being shown between each pair of adjacent propeller blades) serve as the rotor of the compressor stage and the vanes 44 which are preferably uniformly spaced circumferentially of the passage 48 serve as the stator member. It will be observed that vane passages 92 are formed between adjacent vanes 90 and passages 94 between adjacent vanes 44 and that the air entrant lip 96 of the vanes 44 start juxtaposed the trailing lip 98 of the vanes 90. Moreover, that the vanes 44 are shaped to properly guide the air through the remainder of the passage 48 to the compressor 23.

It will further be noted that the wall 19 of the bracket 20 has an outwardly flaring entrance lip 100 which extends to a point just short of the inner surface of the shrouding 73 so as to provide an annular recess 102 past which air may be moved.

In operation of the plane, assuming the propeller and compressor rotor are started by suitable means such as a starting motor not shown, and the plane is in motion, air enters the passage 80 at the inlet 84 at a velocity and pressure dependent upon the ram effect of the plane in motion. The air is then worked on by the rotary vaned structure of the propeller nose and the stationary vaned structure of the bracket 20 together constituting an initial compressor stage and is delivered to the main compressor unit 23, at the terminus of the passage in chamber 48 at a higher pressure that it entered the passage 80. Some air leaving the vanes 90 is directed through the recess 102 adjacent the lip 100 and serves to cool the power plant.

The compressor 23 further accelerates and compresses the air and delivers it to the passage 60 from which it ultimately reaches the combustion chamber 64 where it mixes with hot gases of combustion and is expanded through the turbine 24 which drives the compressor and propeller.

It will be understood that if the augmenting vanes 44 of the chamber or passage 48 are omitted and merely supporting ribs provided then the vaned rotor comprising the vanes 90 will serve as an air fan or pusher only.

Moreover, where supporting struts are provided in lieu of either or both the vanes 44 and 90 such supports will preferably be of such section for instance, circular so as not to contribute any special motion to the air flow.

Figure 3:
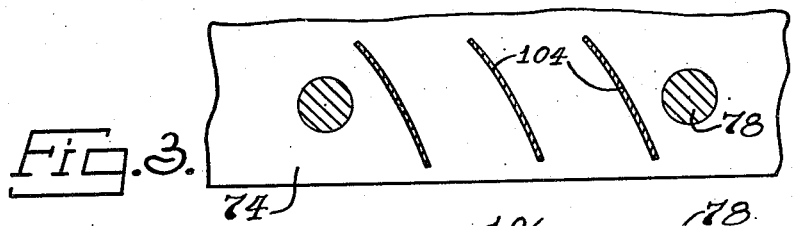
Fig. 3 is a development partly in section of the propeller nose structure of my invention illustrating a modified form of augmenting vane, the view being taken along the line 3—3 of Fig. 2.

In Fig. 3 I have shown a modification of the Fig. 1 arrangement employing thin sheet metal vanes 104 in place of the solid air foil sectioned drive vanes 90 of Fig. 1.

Figure 4:
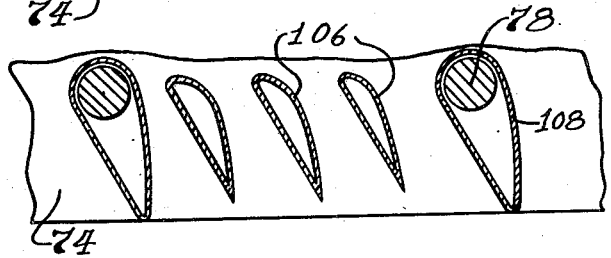
Fig. 4 is a view taken similar to that of Fig. 3 illustrating air foil augmenting vanes.

Fig. 4 illustrates a further modification wherein the vanes 106 corresponding to the vanes 90 of Fig. 1 are of hollow air foil section and wherein the propeller shanks are surrounded by hollow vanes 108 of air foil section but larger than the vanes 106. This arrangement makes possible a uniform augmenting structure for all positions of the propeller blades especially in those instances where the propeller blade has an aerodynamic-shaped portion extending into the passage 80. It will be noted that in this figure the vanes are further forward with respect to the propeller than the vanes of Figs. 1 and 3.

Figure 5:
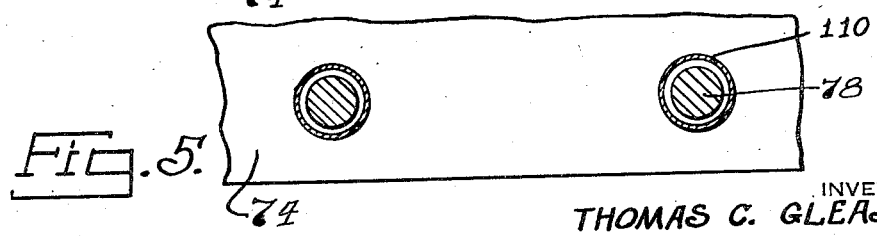
Fig. 5 is another view taken similar to that of Fig. 3, illustrating a form of the invention omitting augmenting vanes and minimizing the turbulence effect of propeller blades having an air screw shape in the region of the air feed inlet passage.

Fig. 5 shows an arrangement wherein the vanes 90 of Fig. 1 are omitted and the propeller arms are surrounded by shells 110 of circular section which support the shrouding 73 and prevent turbulence by the propeller. Little augmenting effect is possible with this arrangement and hence the number of vanes 44 may be reduced to a number merely sufficient to support the gear box.

From the foregoing description it will be apparent that I have provided novel means for delivering air at low turbulence and high pressure to the air compressor and have further provided means for augmenting such pressure at a place ahead of the air compressor.

While the particular arrangements disclosed and described are well adapted for carrying out the objects of the present invention, it will be understood that various modifications, changes and substitutions may be made without departing from the spirit thereof and the present invention is to be construed to include all such modifications, changes, and substitutions as may come within the scope of the following claims.

What I claim as new and desire to protect by Letters Patent is:

1. In an air feeding means for the power plant of an aircraft having a fuselage, a nosed propulsion propeller ahead of the fuselage and means for driving the propeller; in combination, an open-ended rotatable annular shrouding member carried by the propeller and encircling the central region of the propeller, the exterior of said shrouding extending forwardly axially from the fuselage to beyond the propeller blades, the interior of said member being spaced radially from the propeller nose to provide an annular air intake conducting passage, a plurality of circumferentially spaced pressure augmenting vanes of air foil section extending radially between said nose and member in said passage, an annular air chamber behind said propeller and connecting with said passage, said chamber being defined by inner and outer stationary walls, the latter converging inwardly rearwardly of said chamber, and a plurality of circumferentially spaced vanes of air foil section extending radially between said walls within said chamber and juxtaposed said pressure augmenting vanes.

2. In an air feeding means for the power plant of an aircraft having a fuselage, a nosed propulsion propeller ahead of the fuselage and means for rotatably driving the propeller; in combination an open-ended rotatable annular shrouding member carried by the propeller and encircling the central region of the propeller to provide an annular air intake passage; spaced openings in said member through which the blade may project with clearance, a plurality of air-pushing vanes of air foil section substantially aligned with said blades and extending between the said propeller nose and interior of said member, there being at least one vane between immediately adjacent blades, an air compressor rearwardly of said propeller, a stationary annular chamber intermediate said propeller and compressor and connecting with said passage and compressor, said chamber being defined by inner and outer spaced walls, the latter converging rearwardly toward the axis of rotation of the propeller.

3. In an air feeding means for the power plant of an aircraft having a fuselage, a nosed propulsion propeller ahead of the fuselage and means for rotatably driving the propeller; in combination, an axial flow air compressor within said fuselage and ahead of the driving means, an open-ended rotatable annular shrouding member carried by the propeller and encircling the central region of the propeller, the said shrouding extending forwardly axially from the fuselage to beyond the propeller blades, the interior of the shrouding being spaced radially from the propeller nose to provide an annular air passage of greater diameter than said compressor, spaced openings in said member through which the propeller blades may project with clearance, a plurality of air-pushing vanes substantially aligned with said blades and extending between said nose and said member, there being a vane surrounding each blade and at least one vane between intermediately adjacent blades, an annular chamber intermediate the propeller and compressor and converging to meet the latter and a plurality of circumferentially spaced vanes extending radially within said chamber and juxtaposed the vanes of said member.

4. In an air feeding means for the power plant of an aircraft having a fuselage, a nosed propulsion propeller ahead of the fuselage and means for rotatably driving the propeller; in combination, an axial flow air compressor coaxial with the propeller and intermediate the propeller and driving means, an open-ended rotatable annular shrouding member disconnected from but forming a continuation of said fuselage and extending forwardly beyond the propeller, said member surrounding said propeller nose and being supported thereby for rotation therewith in spaced relationship thereto to form an axially extending passage, a plurality of circumferentially spaced air-pushing vanes of air foil section in said passage extending between said nose and member and rotatable therewith, an annular air chamber immediately behind the propeller and immediately in front of the compressor, said chamber being defined by inner and outer stationary walls, the latter converging at its rearward end to meet the compressor, and a plurality of circumferentially spaced stationary vanes of air foil section extending a portion of the length of said chamber and radially between said walls.

5. In an air feeding means for the power plant of an aircraft having a fuselage, a nosed propulsion propeller ahead of the fuselage and means for rotatably driving the propeller; in combination, an axial flow air compressor coaxial with the propeller and intermediate the propeller and driving means, an open-ended rotatable annular shrouding member encircling the central region of the propeller and disconnected from but forming a continuation of said fuselage, the said member surrounding said propeller nose and being supported thereby for rotation therewith in spaced relationship thereto to form an axially extending passage, a plurality of circumferentially spaced air-pushing vanes of air foil section in said passage substantially transversely aligned with said propeller blades, there being at least one vane between immediately adjacent propeller blades, an annular chamber immediately behind said propeller and immediately in front of said compressor, said chamber being defined by inner and outer stationary walls, said outer wall being spaced inwardly of said member and said fuselage at the joinder thereof and converging at its rearward end whereby to provide an air conduit between said passage and compressor and an air bypass connecting with the space between said outer wall and said fuselage, and a plurality of circumferentially spaced stationary vanes axially juxtaposed the vanes of said member, said vanes being of air foil section and extending a portion of the length of said chamber radially between said walls.

6. In an air feeding means for the power plant of an aircraft having a fuselage and a bladed and nosed propulsion propeller ahead of the fuselage; in combination an open-ended annular shrouding member rotatable with the propeller and encircling the central region of the propeller, the exterior of said shrouding member extending forwardly axially from the fuselage to beyond the encircled portion of the propeller blades, the interior of said member being spaced radially from the propeller nose to provide an annular air intake conducting passage, a plurality of circumferentially spaced pressure-augmenting vanes in said passage extending radially between said nose and shrouding member and in transverse alignment with said propeller, an annular air chamber behind said propeller and intake passage and connecting with said passage, said air chamber being stationary relative to said fuselage and being defined by inner and outer walls extending axially within said fuselage and terminating in an outlet, an air compressor within the fuselage in tandem with said air chamber and connecting with the said terminal outlet of said chamber.

7. In an air feeding means for the power plant of an aircraft having a fuselage, a nosed propulsion propeller ahead of the fuselage, and a gear box; in combination, an axial flow air compressor arranged in tandem with said propeller and gear box in the order named, an open-ended rotatable annular shrouding member carried by the propeller and encircling the central region of the propeller, the interior of said member being spaced radially from the propeller nose to provide an annular air intake conducting passage, a stationary annular element within the fuselage and spaced radially from the gear box for providing therewith an annular air chamber connecting the said annular air chamber connecting the said annular air passage and said compressor, a plurality of circumferentially spaced cambered pressure augmenting vanes in said intake passage and rotatable with said propeller, and a plurality of circumferentially spaced ribs in said chamber connecting said stationary element and said gear box.

8. In an air feeding means for the power plant of an aircraft having a fuselage, a nosed propulsion propeller ahead of the fuselage and means for driving the propeller; in combination, an open-ended rotatable annular shrouding member carried by the propeller and encircling the central region of the propeller, the exterior of said shrouding extending forwardly axially from the fuselage to beyond the propeller blades, the interior of said member being spaced radially from the propeller nose to provide an annular air intake conducting passage, a plurality of circumferentially spaced pressure augmenting vanes extending radially between said nose and member in said passage, an annular air chamber behind said propeller and connecting with said passage, said chamber being defined by inner and outer stationary walls, the latter converging inwardly rearwardly of said chamber, and a plurality of circumferentially spaced vanes extending radially between said walls within said chamber and juxtaposed said pressure augmenting vanes.

9. In an air feeding means for the power plant of an aircraft having a fuselage, a nosed propulsion propeller ahead of the fuselage and means for rotatably driving the propeller; in combination, an air compressor coaxial with the propeller and intermediate the propeller and driving means, an open-ended rotatable annular shrouding member encircling the central region of the propeller and disconnected from but forming a continuation of said fuselage, the said member surrounding said propeller nose and being supported thereby for rotation therewith in spaced relationship thereto to form an axially extending passage, a plurality of circumferentially spaced cambered pressure augmenting vanes in said passage substantially transversely aligned with said propeller blades, there being at least one vane between immediately adjacent propeller blades, an annular chamber immediately behind said propeller and immediately in front of said compressor, said chamber being defined by inner and outer stationary walls, said outer wall being spaced inwardly of said member and said fuselage at the joinder thereof and converging at its rearward end whereby to provide an air conduit between said passage and compressor and an air bypass connecting with the space between said outer wall and said fuselage, and a plurality of circumferentially spaced stationary vanes axially juxtaposed the first mentioned vanes, said stationary vanes being of cambered shape and extending a portion of the length of said chamber radially between said walls.

THOMAS C. GLEASON.

(References on following page)

REFERENCES CITED

The following references are of record in the file of this patent:

UNITED STATES PATENTS

| Number | Name | Date |
|---|---|---|
| 1,382,535 | Offen | June 21, 1921 |
| 1,408,753 | Long | Mar. 7, 1922 |
| 1,414,418 | Jaray | May 2, 1922 |
| 1,907,454 | Squires | May 9, 1933 |
| 2,022,900 | Pavlecka | Dec. 3, 1935 |
| 2,274,743 | Rosskopf | Mar. 3, 1942 |
| 2,313,491 | Le Moigne | Mar. 9, 1943 |
| 2,326,072 | Seippel | Aug. 3, 1943 |
| 2,330,622 | Ramshorn | Sept. 28, 1943 |
| 2,384,088 | Hagen | Sept. 4, 1945 |
| 2,397,999 | Goddard | Apr. 9, 1946 |
| 2,407,223 | Caldwell | Sept. 10, 1946 |

FOREIGN PATENTS

| Number | Country | Date |
|---|---|---|
| 518,873 | Great Britain | Mar. 11, 1940 |
| 543,219 | Great Britain | Feb. 16, 1942 |
| 587,516 | Great Britain | Apr. 29, 1947 |
| 857,916 | France | Apr. 29, 1940 |
| 882,069 | France | Feb. 15, 1943 |